Reissued June 29, 1948

Re. 23,013

UNITED STATES PATENT OFFICE 23,013

METHOD OF IMPROVING THE PROCESSING OF REFINED CHEMICAL PULP INTO VISCOSE

Paul Henry Schlosser and Kenneth Russell Gray, Shelton, Wash., assignors to Rayonier Incorporated, Shelton, Wash., a corporation of Delaware No Drawing. Original No. 2,432,127, dated December 9, 1947, Serial No. 506,585, October 16, 1943. Application for reissue March 31, 1948, Serial No. 18,298

25 Claims. (Cl. 260—217)

This invention relates to the production of cellulosic products, and has for its general object the provision of certain improvements in carrying out one or more of the processing steps in the production of such products. The invention is of special advantage in the preparation and processing of viscose derived from chemically prepared wood pulp, and in this connection aims to improve the steps of shredding and filtering. The invention provides a method of processing chemical wood pulp comprising the incorporation of a cation-active amino compounded in the pulp prior to the completion of shredding. The invention also provides, as a new article of manufacture, a chemically prepared wood pulp product having incorporated therein a cation-active amino compound.

This application is a continuation-in-part of our application Serial No. 321,695, filed March 1, 1940, now Patent No. 2,331,936.

Chemically prepared wood pulps are extensively used in the industrial arts for the production of such cellulosic products as rayon and other synthetic fibers, nitrocellulose, cellulose acetate, cellulose ethers, Cellophane and similar cellulosic films or sheets, etc. Wood pulp is commonly prepared and marketed in sheet form, and comminution or shredding is customarily one of the initial steps in its subsequent processing. When wood pulp is used in bulk form, either wet or dry, shredding or comminution is frequently a step involved in the subsequent processing. Since such subsequent processing usually involves the conversion of the cellulose of the wood pulp to some cellulose derivative and the solution of the derivative in a suitable solvent, the purpose of shredding is to break down the sheet into a fluffy mass or crumb in which the individual fibers will be suitably exposed to the action of the derivative-forming reagent or reagents. Thus, for example, in the production of viscose, the wood pulp sheet is customarily steeped in a caustic soda solution to form alkali cellulose, and the alkali cellulose, after pressing and while still in sheet form, is shredded or comminuted to properly prepare the cellulose fibers for the xanthating reaction with carbon bisulfide. The resulting sodium cellulose xanthate is dissolved in dilute caustic soda to form the solution commonly known as viscose, which is opacified if desired, filtered, and spun into filaments.

Normal dissolving wood pulps in present use consist mainly of cellulose, but contain appreciable amounts of non-cellulosic impurities, such as hemicelluloses, fats, resins, waxes, etc. One of the main objects in the manufacture of a highly refined dissolving pulp is to remove as much as possible of the non-cellulosic impurities, so that a whiter, purer pulp results, which is capable, in the manufacture of rayon, of producing a higher grade yarn.

We find, however, that not all of the non-cellulosic impurities which can be removed are undesirable, and in fact, certain of such impurities, normally present in small amounts, are highly beneficial in aiding the processing of the pulp into viscose, especially as regards the step of shredding the alkali cellulose. The beneficial impurities which aid the shredding operation are probably of the nature of fiber lubricants which permit the steeped and pressed pulp to be thoroughly shredded into a fluffy condition more readily and without mechanical damage to the alkali cellulose fibers, which would cause them to react incompletely with carbon bisulfide. In a pulp which has not been highly refined, most of these beneficial impurities constitute a portion of the materials removable by organic solvents, as for example, ether, benzene alcohol, etc. These beneficial impurities, often loosely termed "resins," are mainly of the nature of waxes, fats and resins, the latter often being present in a relatively small amount.

In theory, the problem of making a good pulp could be solved by removing all the undesirable impurities while retaining those impurities which facilitate the shredding operation by lubricating the fibers or otherwise. In practice, such a clean-cut separation is difficult to accomplish directly. We have discovered that better results are obtainable by removing most or all of the impurities, including those which serve beneficially as lubricants to the alkali cellulose fibers during shredding, and then adding to the pulp or to the alkali cellulose prior to the completion of shredding a sufficient amount of a material of a class entirely different from the natural impurities originally present, and which greatly aids the steps of shredding and filtering.

White, highly purified or refined wood pulps are very advantageous for the production of high grade rayon yarns of superior strength and color, and for this reason, are highly esteemed by the trade. Such highly refined pulps are in general characterized by having an ether extract of about 0.15% or less where such values refer to the amount of natural ether-extractable material left in the pulp after the purification processes. While our invention is particularly applicable to such highly refined pulps containing not more than about 0.15% of ether-extractable material, and increasingly so as the ether extract approaches zero, it may be applied with certain advantages to the processing of normal dissolving pulps containing substantially more than 0.15% of ether-extractable material, although such pulps do not generally yield the highest grade yarns and their processing into shredded alkali cellulose is not accompanied by any particular difficulty.

The surface-active portion of the beneficial impurities, naturally present as such in the refined pulps or formed during the processing, are predominately of the general class known as anion-active materials.

We have discovered that a class of cation-active amino compounds give important results in the processing of chemical pulps. In general, the compounds which we have discovered for use in our invention are much more effective than the beneficial portion of the impurities naturally present. Accordingly, the cation-active compounds can be used in very minute quantities. This is doubly advantageous, because such additions of materials are inexpensive and also because the very pure pulp treated with the compounds is substantially free from non-cellulosic materials due to the minuteness of the quantity of the compounds required. Based on these discoveries, our invention involves improving one or more of the processing steps in the production of cellulosic products from chemically prepared wood pulp by carrying out one or more of the processing steps in the presence of a cation-active amino compound. When applied to the preparation and processing of viscose derived from chemically prepared wood pulp, the invention particularly involves carrying out the shredding of the alkali cellulose, or at least the final stage of shredding, and the filtration of the viscose in the presence of the cation-active amino compound—or of the amino compound which is cation-active in the form of its soluble salts.

The cation-active amino compounds used in our invention are of the cation-active class, which means that the group or groups responsible for surface activity are in the positive instead of the negative ion of the molecule. As a class, cation-active amino compounds are superior in a number of ways to the anion-active compounds for use in the viscose process prior to the completion of shredding, especially as regards treatment of the original pulp. Many cation-active amino compounds are readily dispersible in all concentrations of caustic soda that would be encountered in any stage of the viscose process and some with a plurality of amino groups may even be truly soluble. This ready dispersibility in caustic soda has advantages as regards the final viscose solution but would seem to preclude or limit their use to steps subsequent to steeping or to the use in the steeping caustic which would, however, be more expensive. We have, however, made the important discovery that cation-active amino compounds possess the remarkable and important property of being absorbed and held very firmly by cellulosic materials in the presence of steeping caustic soda solutions.

The closeness of the association and the firmness with which the amino compound is held to the cellulose even in strong caustic soda solutions gives important results. Thus, even though a cation-active amino compound may be readily dispersible in 18% caustic soda in the absence of cellulose, on the other hand when pulp is impregnated with the compound and then steeped in 18% caustic soda, as in the first step of the viscose process, the compound is substantially retained by the pulp due to the strong attraction for the cellulose.

Many of the compounds of the cation-active amino class while soluble and definitely cation-active in the form of their salts with acids, are, nevertheless, neither soluble nor readily dispersible in strong caustic soda solutions. Such materials, when added as a solution in salt form, to a solution containing excess alkali, separate out almost completely in the form of oils or solid precipitates. Due to the lack of solubility or dispersibility in an alkaline medium such compounds might possibly not normally be considered to be cation-active in alkaline solutions. These compounds are, nevertheless, practical to apply in the invention since they may be added as solutions of their salts with acids. During the steeping step, these compounds, like those readily dispersible in alkali, also possess the property of being very firmly held by the cellulose due either to their insolubility or their attraction for the cellulose or both. They moreover function to give the benefits of the invention in that they markedly improve the shredding operation so that subsequently viscose solutions with improved filtration properties are produced. Furthermore, when used in concentrations of the invention, these agents, due either to their low final concentration or to the effect of the various processing steps through which they pass, become completely dissolved or dispersed in the final viscose solution.

Another great practical advantage in using cation-active amino compounds for treating the pulp itself results from the substantivity of these materials toward cellulose. Thus, the pulp may be treated with these compounds prior to sheet formation as, for example, in the form of a dilute suspension of pulp in water in a stock chest without the necessity of very completely recirculating the white water. This is in contrast to the practical limitations under which anion-active compounds would usually have to be used when being applied to the pulp. With anion-active compounds it is generally necessary to apply these after the sheet has been formed and the greater part of the water has been removed, or in the event of addition prior to sheet formation to provide for a system of almost complete recirculation of the white water to prevent excessive loss of the compounds. The cation-active amino compounds, on the other hand, will be substantially exhausted from a very dilute solution or dispersion by a suspension of pulp fibers and the materials will be substantially retained by the fibers during the mechanical dehydration pursuant to sheet formation.

Amino groups are of three types: primary, secondary, and tertiary. Each of these types may exist in five different forms to a different degree (in some cases completely and in other to only a small degree):

1. Free amino group—anhydrous.
2. Free amino group—hydrated and not ionized.
3. Free amino group—hydrated and ionized.
4. Amino group in form of salts with acids—unionized.
5. Amino group in form of salts with acids—ionized.

The three types in their different forms may be shown as follows:

| Form | Type I Primary Amino Group | Type II Secondary Amino Group | Type III Tertiary Amino Group |
|---|---|---|---|
| 1 | $-NH_2$ | $>NH$ | $-N<$ |
| 2 | $-NH_3OH$ | $>NH_2OH$ | $-NHOH$ |
| 3 | $[-NH_3]^+OH^-$ | $[>NH_2]^+OH^-$ | $[-NH]^+OH^-$ |
| 4 | $-NH_3X$ | $>NH_2X$ | $-NHX$ |
| 5 | $[-NH_3]^+X^-$ | $[>NH_2]^+X^-$ | $[-NH]^+X^-$ |

In the table above the free bonds shown represent carbon-nitrogen linkages while the symbol "X" represents the anion of an acid forming a salt with the free amino group.

Generally in the presence of water an amino group in the form of a salt (substituted ammonium salt) will be largely in the ionized form. In the presence of water (except in very dilute solutions) compounds containing one free amino group, however, will exist largely in the unionized forms, hydrated and anhydrous. Obviously with compounds containing a multiplicity of free amino groups, in the presence of water there will be a greater proportion of molecules having at least one amino group in the hydrated, ionized form.

As used generically in this application, the term "amino compound" refers to a compound having at least one of any of the three types of amino groups shown in the table in any one, or in an equilibrium mixture of more than one, of the five forms shown.

Surface-active compounds are compounds containing one or more lipophilic (oil or fat attracting, water repulsing) groups together with a hydrophilic group or a plurality of hydrophilic groups. Further the lipophilic group or groups must be of sufficient magnitude to impart to a portion of the molecule a substantial repulsive action towards water. The hydrophilic group or plurality of hydrophilic groups must possess a sufficient hydrophilic character so that the molecule is water soluble or at least soluble to the extent that it is readily dispersible in a finely divided form in water.

The surface-active property of molecules thus arises as the result of their containing at least one hydrophilic (water attracting) group and at least one lipophilic (fat or oil attracting and hence water repulsing) group. By virtue of the compounds containing a hydrophilic group, they are at least to a certain extent soluble in water. However, by virtue of their containing a lipophilic group, they tend to be repulsed by the water. Thus they tend to concentrate largely on the surface of the water or inter face layer where they can take up a compromise position with the hydrophilic group resting in the water and the lipophilic group sticking out of the water.

The compounds of the invention are such surface-active lipophilic-hydrophilic combinations in which the hydrophilic effect is provided either wholly or in part through the presence of an amino group or a plurality of amino groups.

That the compounds are "cation" active is due to the fact that they will ionize either largely or at least in small part through the form of their salts with acids or through the form of a hydrated free amino group.

Where the compounds contain a plurality of amino groups, these are preferably connected by short links—for example, by ethylene groups or by segments of a ring, though longer connecting links are not ruled out.

A single free amino group has a relatively weak hydrophilic effect while on the other hand the same group converted into a salt has a strong hydrophilic effect. Thus many of the cation-active amino compounds of the invention (particularly those with only one amino group) form substantially surface-active solutions only in the form of salts with acids. It is to be noted that many commercial materials of this type are known as "cation-active materials of the amine type" or "of the trivalent nitrogen type"—even such materials as will practically always be used in the form of salts. Others, particularly those containing a multiplicity of amino groups, are at least dispersible in alkaline solution and hence are definitely cation-active in alkaline solution.

As previously stated many of the compounds of the cation-active class while soluble and definitely cation-active in the form of their salts with acids are, nevertheless, neither soluble nor readily dispersible in strong caustic soda solutions. Such materials, when added as a solution in salt form, to a solution containing excess alkali, separate out almost completely in the form of oils or solid precipitates. Due to the lack of solubility or dispersibility in an alkaline medium, such compounds might possibly not normally be considered to be cation-active in alkaline solutions. Whether they are at least partly cation-active when spread out in thin layers on the surface of the alkali cellulose fibers during the shredding operation, we do not know. They are, in any event, effective. Furthermore, they are cation-active in the form in which they are applied—in the form of soluble salts with acids.

While the compounds of the invention are not necessarily dispersible or soluble in the free base form, the free bases must, nevertheless, be substantially stable in solutions of alkali metal hydroxide up to and including the step of shredding.

Where the compounds are employed as salts, the salts of any acid whose anion would normally be innocuous in small concentrations to the viscose process may be used. Such innocuous anions include acetate, chloride, sulphate, etc. We believe in many cases best results will be obtained with the acetates. These salts are less acidic than similar salts of mineral acids and are thus preferred when treating the pulp. Also with those amino compounds of the invention that tend to form difficultly soluble salts, the acetates are frequently more soluble or dispersible than the salts of mineral acids.

In the compounds of the invention the lipophilic group (or each of the lipophilic groups) has substantially a hydrocarbon character but is not limited to the hydrocarbon radicals.

Among the important lipophilic groups are the radicals $$R, RC(=O)-NH- \text{ and } R-O-$$

where R is a higher aliphatic hydrocarbon radical. These radicals may be derived from fats, waxes, vegetable oils, mineral oils, etc. The aliphatic hydrocarbon radicals represented by R include straight chain, branched chain, saturated and unsaturated radicals. Other groups such as cyclic hydrocarbon groups or groups containing a small proportion of other elements than carbon and hydrogen are, however, not excluded.

A lipophilic aliphatic hydrocarbon radical (R) may be connected directly to the amino group (or to one of the plurality of amino groups). The lipophilic groups.

$$RC(=O)-NH \text{ and } R-O-$$

are, however, always connected to the nitrogen through stable intermediary links—preferably, though not restricted to, short alkylene groups such as the ethylene group ($-CH_2CH_2-$).

In regard to the use of the lipophilic groups $$R, RC(=O)-NH- \text{ and } R-O-$$

to induce surface activity, suitable groups will include those having at least 7 carbon atoms. There is a practical upper limit for these or any other type of lipophilic surface-active inducing radical in that the compounds must be soluble or at least dispersible in water. In the preferred cases the group $$R, RC(=O)-NH- \text{ or } R-O-$$

will have from 7–18 carbon atoms. Especially good results have been obtained from compounds in which the radicals $$R, RC(=O)-NH- \text{ or } R-O-$$

had 12 carbon atoms or were prepared from a vegetable oil, such as coconut oil, predominating in lauric acid so that the resulting radicals were mixtures having predominately 12 carbon atoms.

Among the types and individual examples of cation-active amino compounds which may be used are the following:

1. Alkyl Amines

*a. Primary alkyl amines*

Primary amines, saturated and unsaturated, straight chain and branched chain with from 7–18 carbon atoms are effective. In view of the fact that the free bases are not readily dispersible in water by normal procedures, and in view of the fact that the lower free bases are somewhat volatile, these compounds are most practically applied as solutions of water-soluble salts, in most cases preferably as the acetates. Some members can, however, be fairly readily dispersed in water by using special procedures. Examples would include: (1) forming a dispersion of lauryl amine by pouring a solution of lauryl amine acetate into the theoretical amount or an excess of alkali; (2) dispersing the alkyl amine in the presence of a small amount of a soluble salt of the amine.

The compounds herein referred to as alkyl amines are sometimes also termed fatty amines. The term "alkyl," as used herein, refers to unsaturated as well as saturated aliphatic hydrocarbon radicals.

Among the members of this series that we have successfully used are the following:

Heptyl amine, octyl amine, (2-ethyl) hexylamine-1, decylamine, lauryl amine, tetradecylamine, hexadecyl amine, oleylamine, octadecylamine. We have found the most effective and practical compound to apply to be lauryl amine. Actually the technical mixture of primary amines derived from coconut oil and predominating in lauryl amine works best of all—slightly better than the pure compound.

The higher members, e. g., octadecylamine, form salts that are only slightly water-soluble, and while effective, are more difficult to apply in a practical manner.

*b. Secondary and tertiary alkyl amines*

The members of these series will all contain at least 7 carbon atoms. In all cases the upper limit of carbon atoms will be such that the compounds will form salts that are appreciably water-soluble. The most preferred types will contain one long chain while the other chain or chains will be very short, preferably (though not restricted to) methyl or ethyl groups. Examples are methyl lauryl amine, dimethyl lauryl amine.

These compounds are likewise best applied in the form of water-soluble salts.

2. Alkyl Alkanolamines (Alkyl Hydroxyalkylamines)

While compounds of this type may be readily applied in the form of soluble salts, many compounds of this type are sufficiently dispersible in water in free base form to be used as such.

Examples of compounds successfully used include lauryl aminoethanol (lauryl hydroxyethyl amine), condensation products of lauryl amine and glycerine chlorhydrin, dioctyl amino ethanol.

3. Alkyl Ethers of Alkanolamides (Alkyl Ethers of Hydroxyalkylamines)

We have used the lauryl ether of ethanolamine and the mono-lauryl ether of triethanolamine in salt form.

4. Alkyl Cycloalkyl Amines

Compounds of this type are best applied in the form of water-soluble salts. Examples are lauryl piperidine, lauryl methyl cyclohexylamine.

5. Amido Amines

*a. Monoamides of hydroxyethyl polyethylene polyamines*

Compounds of this type may be applied in the form of water-soluble salts but many are sufficiently water-dispersible or soluble to be applied in free base form. Suitable hydroxyethyl polyethylene polyamines for use in preparing the compounds include hydroxyethyl ethylene diamine and hydroxyethyl triethylene tetramine. The preferred amido amine compounds of this type are condensation products which are predominantly monoamides of hydroxyethyl ethylene diamine and fatty acids having from 7–18 carbon atoms.

Examples of compounds successfully used are the monoamides of hydroxyethyl ethylene diamine and oleic, stearic, and mixed coconut fatty acids (the latter predominating in lauric acid). The compound derived from coconut fatty acids was the most effective of all.

*b. Partially acylated polyethylene polyamines*

Polyethylene polyamines that we have successfully used in preparing compounds of this type include diethylene triamine, triethylene tetramine and tetraethylene pentamine. The preferred products are polyethylene polyamines partially acylated with a fatty acid of from 7–18 carbon atoms.

Practically, it is not feasible to prepare a substantially pure monoamide from these polyamines containing two primary amino groups, since a substantial amount of diamide will always tend to form in addition to much smaller amounts of more completely acylated products. We prefer, however, to have the monoamide predominate or at least be as high as practically possible in any mixture of the two, in order that the material will be more water-soluble or dispersible. This will be especially true when the products are formed from the lower members of the polyamines. A higher proportion of monoamide can be accomplished in their preparation by using an excess of the polyamine over the fatty acid, or even better by using an excess of polyamine together with the ethyl or methyl esters of the fatty acids. In either case the excess amine may be substantially removed by vacuum distillation at the end of the reaction.

Examples of products of this type which we have successfully used in the practice of our invention include products having as the predominating compounds the following: Mixtures of the mono and diamides of tetraethylene pentamine and the fatty acids derived from coconut oil, mixtures of the mono and diamides of triethylene tetramine and the fatty acids derived from coconut oil, the diamide of triethylene tetramine and the fatty acids derived from coconut oil, mixtures of the mono and diamides of diethylene triamine and oleic acid, mixtures of the mono and diamides of diethylene triamine and stearic acid, mixtures of the mono and diamides of diethylene triamine and myristic acid, mixtures of the mono and diamides of diethylene triamine and mixed capryllic and capric acids.

Compounds of this type may be applied as solutions of soluble salts (acetates preferred) but in many cases are sufficiently dispersible in free base form to be applied in that condition. Since the products are not pure compounds in certain cases (as with hydrochlorides of certain products from diethylene triamine) solutions of the salts will contain in dispersed form a certain amount of undissolved matter. This, however, does not substantially harm the effectiveness of the products in the viscose process.

Having regard to both the effectiveness of the agents and the practical economics of their preparation, the best agents of all of this type are products which are predominantly a mixture of the mono and diamides of diethylene triamine and fatty acids from coconut oil, or other vegetable oil, predominating in lauric acid. Using coconut fatty acids with a mean molecular weight of 212 a monoamide of diethylene triamine would theoretically have a nitrogen content of about 14.15% while a diamide would have a nitrogen content of about 8.55%. Among the products we have prepared and successfully used, and which are predominantly mixtures of mono and diamides, are products having the following nitrogen contents: 8.90%, 9.08%, 9.19%, 10.22%, 10.69%, 11.20%, 11.33%, 11.40%, 11.65%, 12.11% and 12.97%. We most usually, however, employ products having nitrogen contents of around 11.2–11.7% (on an anhydrous basis).

Addition of small amounts of water to these products produces marked changes in the physical properties such as the melting points, apparently due to the formation of fairly stable hydrates. Purely for convenience in handling and storing the materials, we frequently add from 1–6% water at the end of the preparation and while the reaction mixture is in a partly cooled but still molten condition. This does not alter the effectiveness of the materials in the viscose process.

*c. Monoamides of derivatives of ethylene diamine*

Compounds of this type are best applied as solutions of soluble salts. An example of a compound successfully used is the oleic acid amide of unsymmetrical diethyl ethylene diamine.

6. Imidazolines

Compounds of this type are best applied in the form of soluble salts. In the preferred cases they will have substituted in the ring an alkyl chain (saturated or unsaturated) of from 7–18 carbon atoms. Compounds successfully used include 2-undecyl imidazoline, 2-heptadecyl-N-acetamidoethyl imidazoline.

While highly refined wood pulps are advantageous for the production of high grade rayon yarns of superior strength and color, the reaction of the shredded alkali cellulose from such pulps with carbon bisulfide is frequently incomplete. This impairment in the xanthating activity of the shredded alkali cellulose is due to some damage to the fibers during the shredding operation or to incomplete comminution or to formation of compressed fiber bundles. In the case of the conventional shredder having revolving blades coacting with a stationary saddle bar, the tendency for such damage is especially great if the clearance between the revolving blades and the saddle bar is a little less than the correct value. In an extreme case, with a very highly refined pulp, shredding, even under optimum conditions, may produce a shredded pulp which xanthates less completely than if the alkali cellulose were not shredded at all. In other cases it is possible to obtain reasonably satisfactory shredding of the alkali cellulose from highly refined pulps by adjusting the shredder clearance and by experimenting to find the optimum shredding time for the particular pulp and particular shredder. In this manner it is possible in some cases to obtain almost as complete a degree of xanthation of the shredded alkali cellulose from a highly refined pulp as would be obtained with the shredded alkali cellulose from a less pure pulp. But the necessity of constant supervision and adjustment to assure optimum shredding conditions makes the shredding of highly refined pulps too sensitive for satisfactory commercial practice. This sensitivity to damage during shredding of the alkali cellulose from highly refined pulps is overcome, in our invention, by carrying out the shredding operation in the presence of a cation-active amino compound, or of an amino compound which is cation-active in the form of its soluble salts with acids, and which in either event may be added as a cation-active compound to the pulp prior to use in the viscose process or to the alkali cellulose prior to the completion of shredding. The improvement in shredding produces a shredded alkali cellulose which reacts substantially completely with carbon bisulfide, and the resulting viscose is comparatively free of unreacted fibers and filtration proceeds more rapidly and economically.

In the usual viscose process the sheets are first subjected to a steeping step to convert the cellulose to alkali cellulose, and the pressed sheets of alkali cellulose are then shredded to form a fluffy mass of fibers. The fluffy mass is xanthated, dissolved in dilute caustic soda and the solution commonly known as viscose filtered to remove undissolved fibers and gel-like materials, and ripened to impart the desired properties for satisfactory spinning.

The most practical and economical manner of securing the desired presence of an amino compound of our invention during the shredding of the alkali cellulose and during the filtration of the viscose is to incorporate the amino compound in the wood pulp either in the form of a cation-active, dispersible or soluble free base or in the form of a cation-active soluble salt of an acid. This may be advantageously effected by adding the cation-active amino compound (either salt of an acid or free base) to the pulp on the sheet-forming machine subsequent to sheet formation but prior to complete drying, by spraying the pulp sheet with an aqueous solution or dispersion of the compound or by means of a rotating roll partly immersed in such a solution or dispersion. If desired, the amino compounds of the invention may be incorporated in the pulp prior to sheet formation, as, for example, by adding the agent to a suspension of pulp in water in a stock chest. In the latter case, the white water need not be recirculated in order to prevent considerable loss of the agent when eliminating water in sheet formation in view of the substantivity of the products toward cellulose. In any case, there is produced a chemically prepared wood pulp product having a cation-active amino compound incorporated therein. When the cation-active amino compound is so incorporated in the wood pulp, by the manufacturer thereof, the pulp comes to the rayon manufacturer in a form calculated to secure the full advantages of the invention in the preparation and processing of the viscose into high grade rayon yarns.

The amount of the cation-active amino compounds used in the practice of the invention is relatively small, ranging from 0.01 to 0.20%, and preferably from 0.02 to 0.10%, by weight on the bone dry weight of the wood pulp used, when the agent is incorporated in or added to the pulp or to the alkali cellulose. So far as the objectives of the invention are concerned, there is little if any improvement by increasing the amount of amino compound above 0.20% and such higher amounts frequently give rise to certain disadvantages. These disadvantages include the causing of excessive softness in the sheet, resulting in mechanical difficulties in steeping, excessive ball formation in xanthation, difficulties in the dissolving operation due both to the excessive ball formation in the xanthating step and due to excessive foaming in the viscose solution. Also there may be considerable difficulty in obtaining a completely deaerated viscose which is absolutely necessary for satisfactory spinning. Higher concentrations of the amino compounds may also unduly lower the surface tension of the viscose, thus changing the coagulating conditions so that the viscose cannot be satisfactorily spun by standard methods, causing the filaments to break and the thread to stick to the godet wheels or thread guides.

While it is our preferred practice to incorporate the cation-active amino compound in the wood pulp, preferably a highly refined pulp containing not more than about 0.15% of ether-extractable material, the presence of the compound during the processing steps of shredding may be secured in any other appropriate manner. Moreover, when the pulp is in sheet form, the compound need not be incorporated in every sheet, but may be incorporated in only alternate sheets. It may be added to only a portion of the pulp in whatever form it is marketed. Alternatively, the compound may be sprayed upon or otherwise suitably added to all or a portion of the alkali cellulose prior to shredding or prior to the completion of shredding. However, we believe it will generally be found more advantageous to incorporate the cation-active amino compound in the initial wood pulp product, both as a matter of convenience and economy in preparing and processing the viscose, and because a very uniform distribution of the compound throughout the viscose is easily attained.

When the invention is practiced for effecting the hereinbeforementioned improvements in shredding, certain further economies are effected in the subsequent steps of xanthating, dissolving and filtering. In viscose solutions there is usually a certain amount of undissolved fibers and gel-like material due to the incomplete reaction of the cellulose with the carbon bisulfide during xanthation. Prior to spinning, the viscose solutions are filtered several times to remove these gels and undissolved fibers. In the event that the viscose solutions contain excessive amounts of undissolved and partially dissolved fibers, filtration is an expensive operation. In such cases the filters become rapidly clogged and the filter media must be changed frequently in order that the viscose will pass through in a reasonable time. Frequent changing of the filter media is expensive, not only as regards consumption of filter cloth but also in view of the very considerable amount of labor involved and also since a certain amount of viscose is lost every time the filter is opened up. Furthermore, when the viscose solutions contain very large proportions of gel-like material, filtration is usually not altogether satisfactory in that some of the smaller gel-like particles tend to pass through the pores of the cloth with adverse effect upon the spinning operation. It has heretofore been the practice in the viscose industry, when processing pulps which tend to yield viscose solutions high in undissolved material and having poor filtration properties, to minimize such difficulties by carrying out the xanthation with amounts of carbon bisulfide considerably in excess of that normally required. Use of excess carbon bisulfide is expensive and in addition is technically undesirable in that it may adversely affect certain properties such as the ripening of the viscose and yarn characteristics. We have found that when processing highly purified pulps which would normally tend to give poorly filtering viscose solutions, the addition of minute amounts of the amino compounds of the invention so improves the shredding operation that the alkali cellulose subsequently reacts much more completely with carbon bisulfide and yields a viscose solution very free from undissolved and partially dissolved cellulose particles and having good filtration properties. This result can be accomplished not only without the use of excess carbon bisulfide, but in many cases satisfactory viscose solutions can be obtained using amounts of carbon bisulfide very substantially less than the amounts normally required.

We claim:

1. The method of improving the processing of refined chemical pulp containing not more than 0.15% ether-extractable matter into viscose comprising adding to one of the viscose-forming materials at a stage prior to completion of shredding a cation-active amino compound at least dispersible in water, containing nitrogen having up to three valences attached to carbon atoms, and whose free base is stable in solutions of alkali metal hydroxide, said compound being added in a range from 0.01% to 0.20% by weight, such percentages being based on the weight of the bone dry pulp.

2. The method of improving the manufacture of shredded alkali cellulose from refined chemical pulp containing not more than 0.15% ether-extractable matter comprising adding to one of the alkali cellulose forming materials at a stage prior to the completion of shredding a cation-active amino compound at least dispersible in water, containing nitrogen having up to three valences attached to carbon atoms, and whose free base is stable in solutions of alkali metal hydroxide, said compound being added in a range from 0.01% to 0.20%, such percentages being based on the weight of the bone dry pulp.

3. The method of improving the processing of refined chemical pulp containing not more than 0.15% ether-extractable matter into viscose comprising adding to such refined chemical pulp prior to use in the viscose process a cation-active amino compound at least dispersible in water, containing nitrogen having up to three valences attached to carbon atoms, and whose free base is stable in solutions of alkali metal hydroxide, said compound being added in a range from 0.01% to 0.20% by weight, such percentages being based on the bone dry weight of the pulp.

4. As a new article of manufacture, a refined chemical pulp product containing not more than 0.15% of natural ether-extractable matter and having incorporated therein a cation-active amino compound at least dispersible in water, containing nitrogen having up to three valences attached to carbon atoms, and whose free base is stable in solutions of alkali metal hydroxide, the amount of the incorporated amino compound being from 0.01% to 0.20% by weight, such percentages being based on the bone dry weight of the pulp.

5. The method of improving the processing of refined chemical pulp containing not more than 0.15% ether-extractable matter into viscose comprising adding to one of the viscose-forming materials at a stage prior to completion of shredding a cation-active amido amine compound at least dispersible in water and whose free base is stable in solutions of alkali metal hydroxide, said compound being added in a range from 0.01% to 0.20% by weight, such percentages being based on the weight of the bone dry pulp.

6. The method of improving the manufacture of shredded alkali cellulose from refined chemical pulp containing not more than 0.15% ether-extractable matter comprising adding to one of the alkali cellulose forming materials at a stage prior to the completion of shredding a cation-active amido amine compound at least dispersible in water and whose free base is stable in solutions of alkali metal hydroxide, said compound being added in a range from 0.01% to 0.20%, such percentages being based on the weight of the bone dry pulp.

7. The method of improving the processing of refined chemical pulp containing not more than 0.15% ether-extractable matter into viscose comprising adding to such refined chemical pulp prior to use in the viscose process a cation-active amido amine compound at least dispersible in water and whose free base is stable in solutions of alkali metal hydroxide, said compound being added in a range from 0.01% to 0.20% by weight, such percentages being based on the bone dry weight of the pulp.

8. As a new article of manufacture, a refined chemical pulp product containing not more than 0.15% of natural ether-extractable matter and having incorporated therein a cation-active amido amine compound at least dispersible in water and whose free base is stable in solutions of alkali metal hydroxide, the amount of the incorporated compound being from 0.01% to 0.20% by weight, such percentages being based on the bone dry weight of the pulp.

9. The method of improving the processing of refined chemical pulp containing not more than 0.15% ether-extractable matter into viscose comprising adding to one of the viscose-forming materials at a stage prior to completion of shredding a cation-active alkyl amine compound at least dispersible in water, containing nitrogen having up to three valences attached to carbon atoms, and wherein one of the groups attached to the nitrogen is a hydrocarbon chain of at least 7 carbon atoms, said compound being added in a range from 0.01% to 0.20% by weight, such percentages being based on the weight of the bone dry pulp.

10. The method of improving the manufacture of shredded alkali cellulose from refined chemical pulp containing not more than 0.15% ether-extractable matter comprising adding to one of the alkali cellulose forming materials at a stage prior to the completion of shredding a cation-active alkyl amine compound at least dispersible in water, containing nitrogen having up to three valences attached to carbon atoms, and wherein one of the groups attached to the nitrogen is a hydrocarbon chain of at least 7 carbon atoms, said compound being added in a range from 0.01% to 0.20%, such percentages being based on the weight of the bone dry pulp.

11. The method of improving the processing of refined chemical pulp containing not more than 0.15% ether-extractable matter into viscose comprising adding to such refined chemical pulp prior to use in the viscose process a cation-active alkyl amine compound at least dispersible in water, containing nitrogen having up to three valences attached to carbon atoms, and wherein one of the groups attached to the nitrogen is a hydrocarbon chain of at least 7 carbon atoms, said compound being added in a range from 0.01% to 0.20% by weight, such percentages being based on the bone dry weight of the pulp.

12. As a new article of manufacture, a refined chemical pulp product containing not more than 0.15% of natural ether-extractable matter and having incorporated therein a cation-active alkyl amine compound at least dispersible in water, containing nitrogen having up to three valences attached to carbon atoms, and wherein one of the groups attached to the nitrogen is a hydrocarbon chain of at least 7 carbon atoms, the amount of the incorporated compound being from 0.01% to 0.20% by weight, such percentages being based on the bone dry weight of the pulp.

13. The method of improving the processing of refined chemical pulp containing not more than 0.15% ether-extractable matter into viscose comprising adding to one of the viscose-forming materials at a stage prior to completion of shredding a water soluble salt of a normal primary alkyl amine wherein the alkyl group attached to the nitrogen is an alkyl group with from 7–18 carbon atoms, said compound being added in a range from 0.01% to 0.20% by weight, such percentages being based on the weight of the bone dry pulp.

14. The method of improving the processing of refined chemical pulp containing not more than 0.15% ether-extractable matter into viscose comprising adding to such refined chemical pulp prior to use in the viscose process a water soluble salt of a normal primary alkyl amine wherein the alkyl group attached to the nitrogen is an alkyl group with from 7–18 carbon atoms, said compound being added in a range from 0.01% to 0.20% by weight, such percentages being based on the bone dry weight of the pulp.

15. The method of improving the processing of refined chemical pulp containing not more than 0.15% ether-extractable matter into viscose comprising adding to one of the viscose-forming materials at a stage prior to completion of shredding lauryl amine in a range from 0.01% to 0.20% by weight, such percentages being based on the weight of the bone dry pulp.

16. The method of improving the processing of refined chemical pulp containing not more than 0.15% ether-extractable matter into viscose comprising adding to such refined chemical pulp prior to use in the viscose process lauryl amine in a range from 0.01% to 0.20% by weight, such percentages being based on the bone dry weight of the pulp.

17. The method of improving the processing of refined chemical pulp containing not more than 0.15% ether-extractable matter into viscose comprising adding to one of the viscose-forming materials at a stage prior to completion of shredding a cation-active amido amine condensation product material at least dispersible in water and whose free base is predominantly a polyethylene polyamine partially acylated with a fatty acid of from 7–18 carbon atoms, said material being added in a range from 0.01% to 0.20% by weight, such percentages being based on the weight of the bone dry pulp.

18. The method of improving the processing of refined chemical pulp containing not more than 0.15% ether-extractable matter into viscose comprising adding to such refined chemical pulp prior to use in the viscose process a cation-active amido amine condensation product material at least dispersible in water and whose free base is predominantly a polyethylene polyamine partially acylated with a fatty acid of from 7–18 carbon atoms, said material being added in a range from 0.01% to 0.20% by weight, such percentages being based on the bone dry weight of the pulp.

19. The method of improving the processing of refined chemical pulp containing not more than 0.15% ether-extractable matter into viscose comprising adding to one of the viscose-forming materials at a stage prior to completion of shredding a cation-active amido amine condensation product material at least dispersible in water and whose free base is predominantly a mixture of the mono and diamides of diethylene triamine and fatty acids from coconut oil predominating in lauric acid, said material being added in a range from 0.01% to 0.20% by weight, such percentages being based on the weight of the bone dry pulp.

20. The method of improving the processing of refined chemical pulp containing not more than 0.15% ether-extractable matter into viscose comprising adding to such refined chemical pulp prior to use in the viscose process a cation-active amido amine condensation product material at least dispersible in water and whose free base is predominantly a mixture of the mono and diamides of diethylene triamine and fatty acids from coconut oil predominating in lauric acid, said material being added in a range from 0.01% to 0.20% by weight, such percentages being based on the bone dry weight of the pulp.

21. The method of improving the processing of refined chemical pulp containing not more than 0.15% ether-extractable matter into viscose comprising adding to one of the viscose-forming materials at a stage prior to completion of shredding a cation-active amido amine condensation product material at least dispersible in water and whose free base is predominantly a monoamide of a hydroxyethyl polyethylene polyamine and a fatty acid of from 7–18 carbon atoms, said material being added in a range from 0.01% to 0.20% by weight, such percentages being based on the weight of the bone dry pulp.

22. The method of improving the processing of refined chemical pulp containing not more than 0.15% ether-extractable matter into viscose comprising adding to such refined chemical pulp prior to use in the viscose process a cation-active amido amine condensation product material at least dispersible in water and whose free base is predominantly a monoamide of a hydroxyethyl polyethylene polyamine and a fatty acid of from 7–18 carbon atoms, said material being added in a range from 0.01% to 0.20% by weight, such percentages being based on the bone dry weight of the pulp.

23. The method of improving the processing of refined chemical pulp containing not more than 0.15% ether-extractable matter into viscose comprising adding to one of the viscose-forming materials at a stage prior to completion of shredding a cation-active amido amine condensation product material whose free base is predominantly the mono amide of hydroxy-ethyl ethylene diamine and fatty acids from coconut oil predominating in lauric acid, said material being added in a range from 0.01% to 0.20% by weight, such percentages being based on the weight of the bone dry pulp.

24. The method of improving the processing of refined chemical pulp containing not more than 0.15% ether-extractable matter into viscose comprising adding to such refined chemical pulp prior to use in the viscose process a cation-active amido amine condensation product material whose free base is predominantly the mono amide of hydroxyethyl ethylene diamine and fatty acids from coconut oil predominating in lauric acid, said material being added in a range from 0.01% to 0.20% by weight, such percentages being based on the bone dry weight of the pulp.

25. The method of improving the manufacture of shredded alkali cellulose from refined chemical pulp containing not more than 0.15% ether-extractable matter comprising adding to one of the alkali cellulose forming materials at a stage prior to the completion of shredding a cation-active amino compound at least dispersible in water, containing nitrogen having up to three valences attached to carbon atoms, and whose free base is stable in solutions of alkali metal hydroxide, said compound containing a plurality of amino groups and having a lipophilic aliphatic hydrocarbon radical of at least 7 carbon atoms connected directly to one of the amino groups, said compound being added in a range from 0.01% to 0.20%, such percentages being based on the weight of the bone dry pulp.

PAUL HENRY SCHLOSSER.
KENNETH RUSSELL GRAY.

REFERENCES CITED

The following references are of record in the file of this patent:

UNITED STATES PATENTS

| Number | Name | Date |
|---|---|---|
| 1,737,458 | Hartmann et al. | Nov. 26, 1929 |
| 2,083,744 | Richter | June 15, 1937 |
| 2,267,205 | Kyrides | Dec. 23, 1941 |
| 2,331,936 | Schlosser et al. | Oct. 19, 1943 |

FOREIGN PATENTS

| Number | Country | Date |
|---|---|---|
| 546,051 | Great Britain | June 25, 1941 |